(12) United States Patent
Polo

(10) Patent No.: US 9,760,095 B2
(45) Date of Patent: Sep. 12, 2017

(54) UTILIZING ASYMMETRICAL RADIATION PATTERN TO DETERMINE RELATIVE ORIENTATION

(71) Applicant: Sphero, Inc., Boulder, CO (US)

(72) Inventor: Fabrizio Polo, Boulder, CO (US)

(73) Assignee: Sphero, Inc., Boulder, CO (US)

( * ) Notice: Subject to any disclaimer, the term of this patent is extended or adjusted under 35 U.S.C. 154(b) by 342 days.

(21) Appl. No.: 14/677,850

(22) Filed: Apr. 2, 2015

(65) Prior Publication Data

US 2016/0291600 A1 Oct. 6, 2016

(51) Int. Cl.
| | |
|---|---|
| *G05D 3/12* | (2006.01) |
| *G05B 19/042* | (2006.01) |
| *H04W 4/00* | (2009.01) |
| *G05D 1/00* | (2006.01) |

(52) U.S. Cl.
CPC .............. *G05D 3/12* (2013.01); *G05B 19/042* (2013.01); *G05D 1/0022* (2013.01); *H04W 4/008* (2013.01); *G05D 2201/0214* (2013.01)

(58) Field of Classification Search
CPC ....... G05D 3/12; G05D 1/0022; G05B 19/042
USPC .......................................................... 700/57
See application file for complete search history.

(56) References Cited

U.S. PATENT DOCUMENTS

| | | | | |
|---|---|---|---|---|
| 3,374,967 A | * | 3/1968 | Plumley | F41G 7/305 244/3.14 |
| 5,794,569 A | * | 8/1998 | Titus | A01K 15/023 119/721 |
| 2011/0256800 A1 | * | 10/2011 | Jennings | G01S 1/70 446/456 |
| 2011/0273324 A1 | * | 11/2011 | Petillon | G01S 13/878 342/118 |
| 2013/0173089 A1 | * | 7/2013 | Bernstein | A63H 30/04 701/2 |
| 2014/0020964 A1 | * | 1/2014 | Bernstein | A63H 30/04 180/21 |
| 2014/0051513 A1 | | 2/2014 | Polo et al. | |
| 2014/0236393 A1 | * | 8/2014 | Bernstein | A63H 30/04 701/2 |
| 2014/0238762 A1 | | 8/2014 | Berberian et al. | |
| 2015/0039127 A1 | | 2/2015 | Matsumoto et al. | |
| 2016/0148367 A1 | * | 5/2016 | Polo | G06K 9/3241 382/103 |

OTHER PUBLICATIONS

ISR and Written Opinion in PCT/US2016/025267 dated Jul. 19, 2016.

\* cited by examiner

*Primary Examiner* — Vincent Tran

(57) ABSTRACT

Systems and methods are disclosed herein for determining relative orientation between a self-propelled device and a mobile computing device by utilizing the asymmetric radiation pattern of communication link emissions by the self-propelled device. Upon establishing the communication link, the self-propelled device may perform a spin, thereby enabling the self-propelled device and/or the mobile computing device to detect radiated pulses due to the asymmetry in the link. A direction may be determined based on such pulses, which may be utilized for calibration purposes.

20 Claims, 7 Drawing Sheets

UTILIZING ASYMMETRICAL RADIATION PATTERN TO DETERMINE RELATIVE ORIENTATION

BACKGROUND

Remotely operated devices have previously utilized specialized analog controls requiring a user to perceive a dynamic frame of reference of the device while controlling the device from a static frame of reference of the user. Mufti-functional mobile devices utilizing software applications may be used to control remotely operated devices using virtually generated controls. For remotely operated devices, calibration of the controls and device may be desired in order to provide an enhanced user experience.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
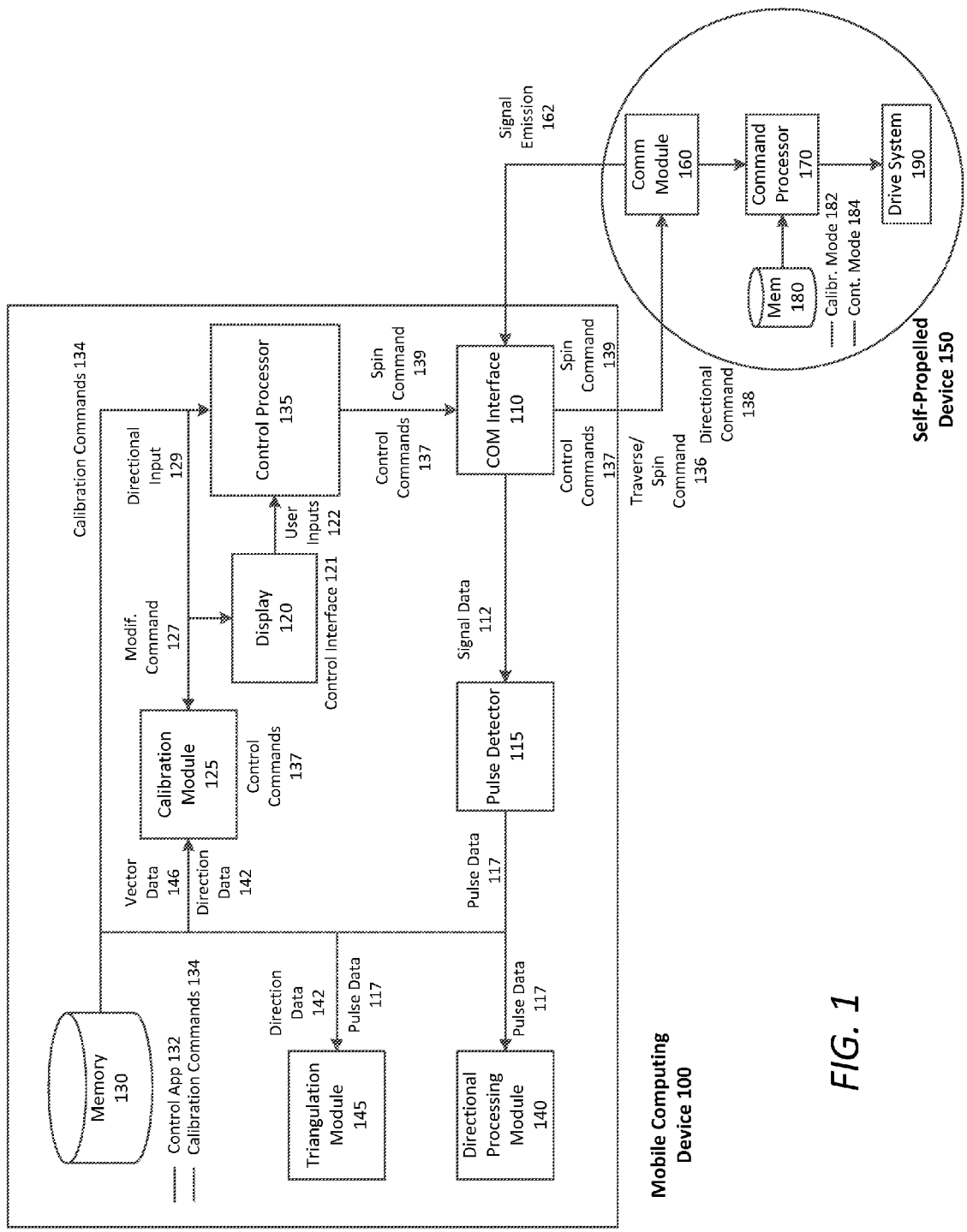
FIG. 1 is a block diagram illustrating example calibration and control interactions between a mobile computing device and a self-propelled device.

Systems and methods are provided for determining relative orientation between a self-propelled device and a mobile computing device. Upon establishing a control connection with the self-propelled device, the mobile computing device can initiate a calibration sequence in which a calibration command is transmitted to the self-propelled device. The calibration command can cause the self-propelled device to perform a spin, whereby asymmetry in the connection signal emitted by the self-propelled device may enable the mobile computing device to detect a set of pulses. Based on the set of pulses, the mobile computing device can determine a direction of the self-propelled device. Once the direction is determined, virtual controls rendered on a display of the mobile computing device may be oriented and calibrated. Furthermore, the orientation of the self-propelled device may be directionally calibrated.

In addition, operational control of the self-propelled device may require precise positional data of the self-propelled device. Thus, in accordance with several examples described herein, the mobile computing device can also transmit an additional traverse and spin command to the self-propelled device, causing the self-propelled device to drive a certain distance and perform a second spin. A second set of pulses detected by the mobile computing device, caused by the spinning asymmetrical connection signal emission, can enable the mobile computing device to triangulate the position of the self-propelled device. Several features may be enabled once the position of the self-propelled device is known. For example, the mobile computing device may track the position of the self-propelled device based on control commands inputted on the virtual controls. Furthermore, dynamic calibration of the virtual controls may be enabled on the mobile computing device based on the dynamic position of the self-propelled device during operational control.

Additionally or alternatively, upon establishing the connection with the mobile computing device, the self-propelled device may initiate a calibration mode in which a number of calibration processes are automated in conjunction with the mobile computing device. Thus, the self-propelled device may automatically initiate the spin and detect the direction of the mobile computing device during or after the spin. Thereafter, the self-propelled device may transmit directional information to the mobile computing device. Furthermore, the self-propelled device may then automatically initiate a traversal drive and spin operation to triangulate the position of the mobile computing device, and transmit relative orientation information to the mobile computing device. Accordingly, the self-propelled device and mobile computing device system may be individually or dually aware of directional and/or positional orientation relative to each other based on the initial calibration and dynamic computations and/or subsequent calibrations performed thereafter.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein can be implemented, in whole or in part, on computing devices such as digital cameras, digital camcorders, desktop computers, cellular or smart phones, personal digital assistants (PDAs), laptop computers, printers, digital picture frames, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a non-transitory computer usable carrier medium capable of carrying such a program.

System and Device Description

FIG. 1 is a block diagram illustrating example calibration and control interactions between a mobile computing device and a self-propelled device. The mobile computing device 100 includes a memory 130 that may store a number of control applications 132 specific for operating the self-propelled device 150. A user of the mobile computing device 100 can initiate a control application 132 which can cause the mobile computing device 100 to establish a connection with the self-propelled device 150. The established connection can initiate a communication module 160 of the self-propelled device 150, which can emit a radio-frequency (RF) signal in an asymmetrical radiation pattern.

In various examples, the established connection between the mobile computing device 100 and the self-propelled device 150 can be established in accordance with one or more of a variety of wireless network technologies, including Bluetooth low energy, Classic Bluetooth, Wireless USB, and various Wi-Fi or other wireless standards. Thus, in accordance with examples described herein, the communication module 160 of the self-propelled device 150 may be a Bluetooth module (classic, low energy, or like protocols) that may be initiated upon receiving a connection signal from the mobile computing device 100. Accordingly, the radiation pattern of the Bluetooth RF emission may exhibit asymmetry, which may be by design or inherent in the communication module 160.

In many examples, upon establishing the connection, the mobile computing device 100 can automatically transmit a calibration command 134 in order to determine a direction to the self-propelled device 150. For example, once the control application 132 is launched on the mobile computing device 100, a control interface 121 may be generated on a display 120 of the mobile computing device 100. The control interface 121 can include, among other features, virtual controls to enable a user to remotely operate the self-propelled device 150.

Typically, remotely operated devices comprise inherent directional characteristics, such as a vehicle's front and rear end. For such devices, analog or virtual controls may be operated by a user straightforwardly in order to maneuver the device. However, for self-propelled devices with less or no inherent directional characteristics (e.g., spherical or cylindrical self-propelled devices), the device itself may be unaware of its orientation relative to the user, so an initial and/or ongoing calibration may be required to in order to configure the device and/or align the virtual controls to enable the user to effectively operate the self-propelled device 150.

In accordance with examples described herein, upon establishing a connection with the self-propelled device 150, the control processor 135 of the mobile computing device 100 can retrieve calibration commands 134 from the memory 130 and transmit the calibration commands 134 to the self-propelled device 150. The calibration commands 134 can be transmitted automatically by the mobile computing device 100 upon execution of the control application 132. Alternatively, a user prompt may be generated on the display 120 of the mobile computing device 100 to prompt the user for automatic calibration, or whether the user wishes to manually calibrate the self-propelled device 150. Furthermore, the control interface 121 may include a selectable feature that enables a user of the mobile computing device 100 to cause calibration of the virtual controls and self-propelled device 150.

The calibration commands 134 may comprise a spin command 139, a control command 137, or a combination thereof. In various implementations, the mobile computing device 100 can instruct the self-propelled device 150 to perform an initial spin. To exploit the asymmetry in the radiation pattern of the connection, the self-propelled device 150 can initiate an internal drive system 190 to engage an inner surface of the self-propelled device 150 to cause the self-propelled device to perform a physical spin, which results in a wobbling signal strength comprised of signal strength pulses detectable by the mobile computing device 100. Alternatively, the spin command 139 can cause a component of the internal communication module 160 (e.g., a Bluetooth low energy antenna) to spin within the self-propelled device 150, thereby achieving a similar wobble in signal strength.

The mobile computing device 100 can receive signal data 112 based on a signal emission 162 from the self-propelled device 150 while the self-propelled device 150 (or the antenna therein) is spinning. The signal data 112 can be parsed or otherwise processed by a pulse detector 115 of the mobile computing device 100. Pulse detector 115 can output pulse data 117 corresponding to the asymmetry in the radiation pattern emitted by the communication module 160. The pulse data 117 can be processed by a directional processing module 140, which can determine a direction towards the pulse source (i.e., the self-propelled device 150).

Once the direction towards the self-propelled device 150 is determined, a calibration module 125 of the mobile computing device 100 can process direction data 142 from the directional processing module 140 and transmit modification commands 127 to the display 120, causing the virtual controls of the control interface 121 to be calibrated in accordance with the directional data 142. Accordingly, the virtual controls may be calibrated in alignment with the self-propelled device 150.

Additionally or as an alternative, the calibration module 125 can utilize the direction data 142 to issue a directional input 129 to the control processor 135, which can translate the directional input 129 into a directional command 138. The control processor 135 can then transmit the directional command 138 to the self-propelled device 150, which can cause the self-propelled device 150 to orient itself rotationally in alignment with the calibrated virtual controls.

In processing the directional command 138, the self-propelled device 150 can include a command processor 170, which can implement the directional command 138 on an internal drive system 190 of the self-propelled device 150.

Thus, the directional command 138 can cause the internal drive system 190 to individually transfer power to one or more internal wheels, engaged with an inner surface of the self-propelled device 150, in order to maneuver the self-propelled device 150 to be in alignment with the mobile computing device 100 and the virtual controls.

Thereafter, the control interface 121 and the self-propelled device 150 may be directionally calibrated and a user of the mobile computing device 100 can provide user inputs 122 on the control interface 121, which can be translated by the control processor 135 into control commands 137 to be transmitted to the self-propelled device 150. The control commands 137 can be implemented on the internal drive system 190 by the command processor 170, thereby causing the self-propelled device 150 to maneuver in accordance with the user inputs 122.

Additionally or alternatively, one or more calibration processes may be performed by the self-propelled device 150. As such, upon establishing a connection with the mobile computing device 100, the communication module 160 can emit a signal 162 (e.g., Bluetooth signal) in an asymmetrical radiation pattern. The self-propelled device 150 can implement an initial calibration mode 182, the instructions of which may be stored in a local memory 180 of the self-propelled device 150.

Implementation of the calibration mode 182 can cause the self-propelled device 150 to automatically—without receiving a command (e.g., directional command 138) from the mobile computing device 100—execute a spin, which can enable calibration of the self-propelled device 150.

As discussed above, the mobile computing device 100 can detect the set of pulses due to the asymmetry in the radiation pattern of the communication module 160. Alternatively, the self-propelled device 150 itself can detect a direction towards the mobile computing device 100 by, for example, detecting a set of pulses, corresponding to a wobble in the radiation pattern intersecting with an RF output by the mobile computing device 100. Accordingly, the self-propelled device 150 can determine the direction towards the mobile computing device 100 and align itself accordingly. For example, in calibration mode 182, the command processor 170 of the self-propelled device 150 can cause the internal drive system 190 to orient the self-propelled device 150 such that the mobile computing device 100 is behind the internal drive system 190 within the self-propelled device 150. Once calibrated, the self-propelled device 150 can initiate control mode 184 and receive control commands 137 from the mobile computing device 100. Accordingly, an initial user input on the control interface 121, corresponding to forward acceleration of the self-propelled device 150, can immediately cause the self-propelled device 150 to move forward away from the mobile computing device 100.

The self-propelled device 150 may automatically enter calibration mode 182 upon establishing the connection with the mobile computing device 100, or any time while the connection is established. The calibration mode 182 can cause the command processor 170 of the self-propelled device 150 to initiate a spin to enable the mobile computing device 100 and/or the self-propelled device 150 to detect a direction towards the other. Furthermore, the calibration mode 182 can also cause the command processor 170 of the self-propelled device 150 to initiate a traverse/spin operation on the internal drive system 190 in order to enable the mobile computing device 100 and/or the self-propelled device 150 to determine a positional relationship, or relative orientation, between the self-propelled device 150 and the mobile computing device 100.

According to many examples described herein, after the initial directional calibration of the virtual controls of the control interface 121 and the self-propelled device 150, a positional relationship between the mobile computing device 100 and the self-propelled device 150 may be needed or otherwise preferred. For example, the mobile computing device 100 may store multiple control applications in the memory 130 specific to operating the self-propelled device 150, where each application may instigate a distinct use of the self-propelled device 150. Examples of such uses include: augmented or virtual reality applications in which the self-propelled device 150 is represented in a virtual world rendered on the display 120 in conjunction with the virtual controls, the utilization of an internal camera of the self-propelled device 150 for investigative or entertainment applications; various gaming or research applications in which any number of tasks may be performed for rewards or remuneration (simulated or otherwise), and the like.

Accordingly, upon directional calibration between the mobile computing device 100 and the self-propelled device 150, the control processor 135 of the mobile computing device 100, may transmit additional calibration commands 134 causing the self-propelled device 150 to traverse a certain distance and perform an additional spin. For example, the control processor 135 can generate a traverse/spin command 136 and transmit the same to the self-propelled device 150 after determining the direction to the self-propelled device 150. The traverse/spin command 136 can cause the self-propelled device 150 to (i) traverse for a distance roughly (or precisely) orthogonal to the direction of the mobile computing device 100, and (ii) stop and perform a second spin. As discussed above, the asymmetry in the radiation pattern of the signal emission 162 can cause the pulse detector 115 to receive signal data 112 and output pulse data 117 which can be evidential of a second direction to the self-propelled device 150. The direction data 142 from the initial spin and the pulse data 117 from the second spin can be transmitted to a triangulation module 145 of the mobile computing device 145, which can then determine a position of the self-propelled device 150.

The position of the self-propelled device 150 can be defined and/or dynamically determined as a vector. Thus, the triangulation module 145 can provide vector data 146 to the calibration module 125 in order to further calibrate the virtual controls of the control interface 121 based on a spatial vector defining the spatial relationship between the mobile computing device 100 and the self-propelled device 150. Furthermore, this spatial vector may be continuously calculated as the user operated the self-propelled device 150, such that the position of the self-propelled device 150 relative to the mobile computing device 100 is dynamically determined during operation. Alternatively, the positional relationship between the mobile computing device 100 and the self-propelled device 150 can be tracked by one or both of the devices. Based on the initial calibrated positional relationship, the mobile computing device 100 can identify whether positional relationship is diverging based on the commands and current positional characteristics. If a divergence is detected, the mobile computing device 100 can transmit one or more adjustment commands to correct the divergence.

Alternatively, the self-propelled device 150 may enter calibration mode 182 at any time during operation. This subsequent calibration may be performed, for example, after a predetermined duration of the self-propelled device 150 operating in control mode 184, or upon the mobile computing device 100 or the self-propelled device 150 losing positional accuracy beyond a predetermined threshold. For specialized application purposes, the calibration mode 182 may be initiated during breaks in a task oriented application (e.g., a gaming application). In such implementations, the self-propelled device 150 may perform an automatic calibration when, for example, a user completes a task (e.g., passes a level) that causes the display 120 to generate additional content. While the specialized application is generating the additional content, the self-propelled device 150 may enter calibration mode 150 and recalibrate the positional relationship with the mobile computing device 100.

In addition, during dynamic determination of the spatial relationship between the mobile computing device 100 and the self-propelled device 150, the calibration module 125 can dynamically or periodically calibrate the virtual controls on the control interface 121. For example, while the self-propelled device 150 is maneuvered the calibration module 125 can receive input corresponding to the control commands 137 being transmitted to the self-propelled device 150. Based on the control commands 137 the calibration module 125 can dynamically or periodically transmit modification commands 127 to the display 120 in order to recalibrate the control interface 121. Alternatively, such dynamic or periodic calibrations may be performed based on one or more sensors of the mobile computing device 100, or periodic transmissions sent from the self-propelled device 150.

Methodology

Figure 2A:
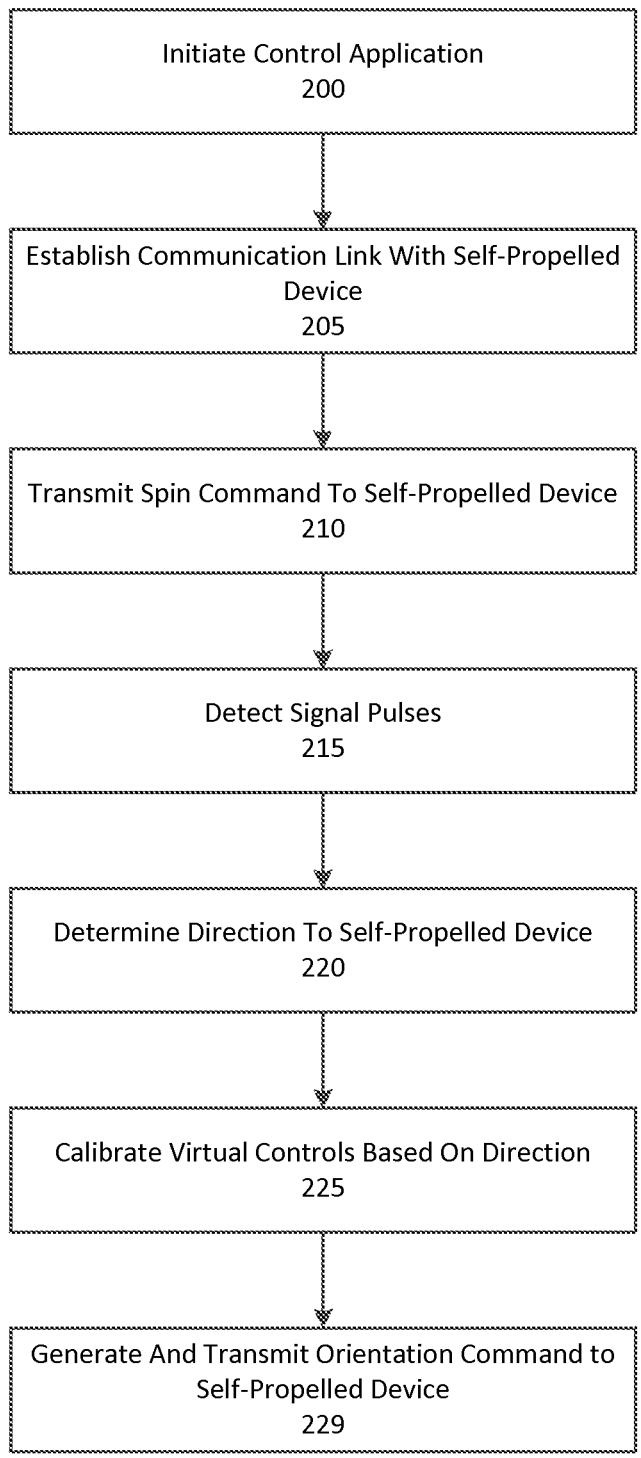
FIG. 2A is a high level flow chart describing an example process of determining relative orientation between a mobile computing device and a self-propelled device.

FIG. 2A is a high level flow chart describing an example process of determining relative orientation between a mobile computing device and a self-propelled device. In the below discussion of FIG. 2A, reference may be made to like reference characters representing various features of FIG. 1 for illustrative purposes. Furthermore, the high level method described in connection with FIG. 2A may be performed by the mobile computing device 100 as illustrated in FIG. 1. Referring to FIG. 2A, a user of the mobile computing device 100 can initiate a control application 132 specific to operating the self-propelled device 150 (200). Numerous applications may be stored in the memory 130 of the mobile computing device 100 that include the function of enabling a user to remotely operate the self-propelled device 150. For example, the control application 132 may generate the control interface 121 to include a basic control feature that allows little more than remote control of the self-propelled device 150. Other examples may include task oriented applications in which the self-propelled device 150 may be controlled in conjunction with tasks to be performed in accordance with generated content (e.g., gaming content) on the control application 121.

Upon initiation the control application 132, the mobile computing device 100 can establish a communication link with the self-propelled device 150 (205). As discussed above, the established connection between the mobile computing device 100 and the self-propelled device 150 can be established in accordance with one or more of a variety of wireless network technologies, including Bluetooth low energy, Classic Bluetooth, Wireless USB, and various Wi-Fi or other wireless standards. Furthermore, the radiation pattern of the Bluetooth RF emission may exhibit asymmetry, which may be by design or inherent in the communication module 160.

Upon establishing the communication link with the self-propelled device 150, the mobile computing device 100 can transmit a spin command to the self-propelled device 150 (210). The spin command can be transmitted automatically, or via a user prompt to calibrate the self-propelled device 150 and/or the virtual controls of the control interface 121. While the self-propelled device 150 is spinning, the mobile computing device 100 can detect signal pulses due to the asymmetry in the radiation pattern (215). Based on the detected signal pulses, the mobile computing device 100 can determine the direction to the self-propelled device 150 (220). Further, accordingly to many examples, once the direction to the self-propelled device 150 is determined, the mobile computing device 100 can calibrate the virtual controls accordingly (225). Additionally or alternatively, the mobile computing device 100 can generate and transmit and orientation command to the self-propelled device 150, causing the self-propelled device 150 to orient itself based on the relative direction (229). For example, the orientation command may instruct the self-propelled device 150 to orient itself so that a forward command on the virtual controls causes the self-propelled device 150 to drive directly away from the mobile computing device 100.

Figure 2B:
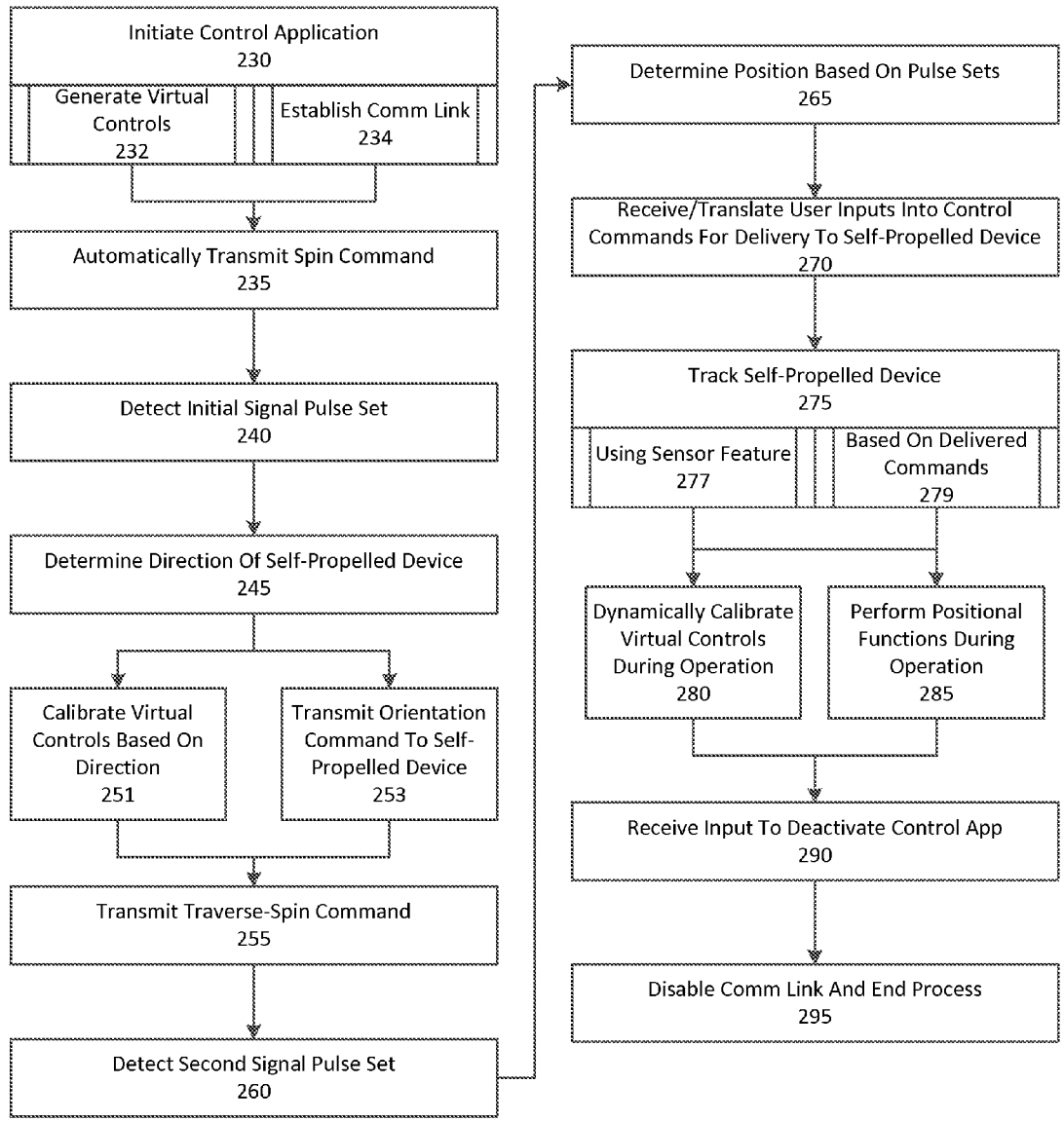
FIG. 2B is a low level flow chart describing an example process of determining relative orientation and position between a self-propelled device and a mobile computing device.

FIG. 2B is a low level flow chart describing an example process of determining relative orientation and position between a self-propelled device and a mobile computing device. In the below discussion of FIG. 2B, reference may be made to like reference characters representing various features of FIG. 1 for illustrative purposes. Furthermore, the low level method described in connection with FIG. 2B may be performed by, for example, the mobile computing device 100 as illustrated in FIG. 1. Referring to FIG. 2B, a control application 132 application 132 can be initiated in response to a user selection (230). Execution of the control application 132 can cause the mobile computing device 100 to generate virtual controls to enable the user to operate the self-propelled device 150 (232). Furthermore, execution of the control application 132 can also cause the mobile computing device 100 to establish a communication link with the self-propelled device 150 (234).

According to many examples, after establishing the communication link, the mobile computing device 100 can automatically generate and transmit a spin command to the self-propelled device 150 (235). Due to the asymmetric nature of the radiation pattern emitted by the self-propelled device 150, the mobile computing device 100 can detect an initial signal pulse set (240). Based on the detected signal pulses, the mobile computing device 100 can determine the direction of the self-propelled device 150 (245), and subsequently calibrate the generated virtual controls on the display of the mobile computing device 100 (251). Additionally or alternatively, upon determining the direction towards the self-propelled device 150, the mobile computing device 100 can generate and transmit an orientation command causing the self-propelled device 150 to orient itself in relation to the mobile computing device 100 (253).

Thus, directional calibration may be performed based on the directional orientation between the mobile computing device 100 and the self-propelled device 150. Consequently, user operation of the self-propelled device 150 may be enabled, which allows for accurate translation of user inputs 122 performed on the virtual controls into maneuvering the self-propelled device 150. However, in accordance with one or more examples, positional orientation (two-dimensional or three-dimensional) may be desirable based on, for example, the control application 132 or the need for continuous of periodic calibration. Accordingly, the mobile computing device 100 can generate and transmit a traverse-spin command to the self-propelled device 150 (255). This command can cause the self-propelled device 150 to instigate a traversal (e.g., an orthogonal traversal in relation to the mobile computing device 100) and a subsequent spin.

Thus, in accordance with examples described above, a second directional orientation can be determined by detecting a second set of signal pulses due to the asymmetry in the radiation pattern (260). Based on the two directional orientations as determined from the two spins performed by the self-propelled device 150, the mobile computing device 100 can triangulate a positional relationship between the two (265).

Any number of interactions or functions may occur once an accurate position is determined. For example, the mobile computing device 100 can track the self-propelled device 150 without additional sensors (e.g., motion sensors). Such tracking may be performed by way of keeping track of the transmitted control commands 137, feedback provided from the self-propelled device 150, maintaining a virtual mapping based on an initial position, etc. Thus, the mobile computing device 100 can receive and translate user inputs 122 performed on the virtual controls, and deliver the control commands 137 (based on the user inputs 122) to the self-propelled device 150 (270). The self-propelled device 150 can implement such control commands 137 on its internal drive system 190 and maneuver accordingly. As described herein, the mobile computing device 100 can track the self-propelled device 150 (275) using a sensor feature included on the mobile computing device 100 and/or the self-propelled device 150 (277), or based on the delivered commands 137 (279), or both.

In some implementations, the mobile computing device 100 can automatically calibrate the virtual controls (dynamically or periodically) based on tracking the position of the self-propelled device (280). Additionally or alternatively, the mobile computing device 100 can perform any number of positional functions during operation (285) based on determining the location of the self-propelled device 150. Such positional functions may include application-based functions, in which the positional relationship between the mobile computing device 100 and the self-propelled device 150 may be utilized as a variable or function in connection with task-oriented operation of the self-propelled device 150 (e.g., gameplay). Furthermore, the positional relationship may be utilized in virtual or augmented reality applications in which the self-propelled device 150 may be dynamically represented as a virtual object on the rendered control interface 121 on the display 120 of the mobile computing device 100. Thus, any number of interactions and applications may be performed or utilized based on the mobile computing device 100 and/or the self-propelled device 150 having positional awareness in relation to the other.

At the end of a control session, the user of the mobile computing device 100 can provide an end command on, for example, the virtual controls or the power button of the mobile computing device 100. Thus, the control processor 135 can receive this input to deactivate the control application 132 (290). In response to receiving the end command, the mobile computing device 100 can disable the communication link (295), which can cause the self-propelled device 150 to enter a sleep mode.

Example Self-Propelled Device

Figure 3A:
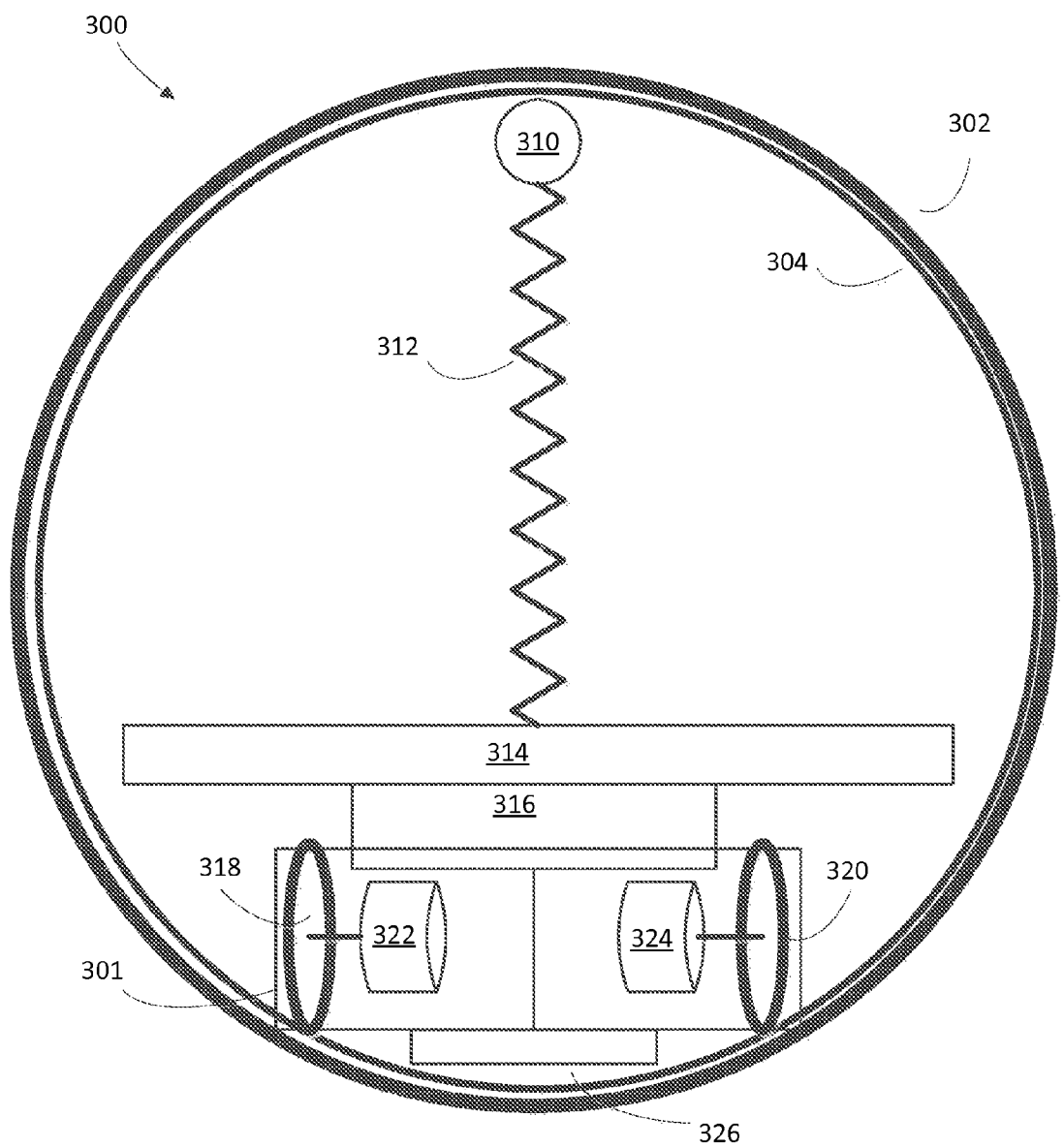
FIG. 3A is schematic diagram illustrating components of an example self-propelled device.

FIG. 3A illustrates schematic diagram of an example self-propelled device 300 upon which examples described herein may be implemented. However, variations of the present disclosure are not limited to such devices. Rather, the systems and methods described herein can be implemented with respect to any remote device in which pairings or connections are made. Referring to FIG. 3A, the self-propelled device 300 can be of a size and weight allowing it to be easily grasped, lifted, and carried in an adult human hand. The self-propelled device 300 can include an outer spherical shell (or housing) 302 that makes contact with an external surface as the device maneuvers. In addition, the self-propelled device 300 can include an inner surface 304 of the outer shell 302. Additionally, the self-propelled device 300 can include several mechanical and electronic components enclosed by outer shell 302 and inner surface 304 (collectively known as the envelope).

The outer shell 302 and inner surface 304 can be composed of a material that transmits signals used for wireless communication, and yet are impervious to moisture and dirt. The envelope material can be durable, washable, and/or shatter resistant. The envelope may also be structured to enable transmission of light and is textured to diffuse the light.

In one variation, the housing is made of sealed polycarbonate plastic. In one example, at least one of the outer shell 302 or inner surface 304 are textured to diffuse light. In one example, the envelope comprises two hemispherical shells with an associated attachment mechanism, such that the envelope can be opened to allow access to the internal electronic and mechanical components.

Several electronic and mechanical components are located inside the envelope for enabling processing, wireless communication, propulsion and other functions (collectively referred to as the "interior mechanism"). Among the components, examples include a drive system 301 to enable the device to propel itself. The drive system 301 can be coupled to processing resources and other control mechanisms, as described with other examples. The carrier 314 serves as the attachment point and support for components of the interior mechanism. The components of the interior mechanism are not rigidly attached to the envelope. Instead, the interior mechanism can be in frictional contact with the inner surface 304 at selected points, and is movable within the envelope by the action of actuators of the drive mechanism.

The carrier 314 can be in mechanical and electrical contact with an energy storage 316. The energy storage 316 provides a reservoir of energy to power the device 300 and electronics and can be replenished through N inductive charge port 326. The energy storage 316, in one example, is a rechargeable battery. In one variation, the battery is composed of lithium-polymer cells. In other variations, other rechargeable battery chemistries are used.

The carrier 314 can provide the mounting location for most of the internal components, including printed circuit boards for electronic assemblies, sensor arrays, antennas, and connectors, as well as providing a mechanical attachment point for internal components.

The drive system 301 includes motors 322, 324 and wheels 318, 320. The motors 322 and 324 connect to the wheels 318 and 320, respectively, each through an associated shaft, axle, and gear drive (not shown). The perimeter of wheels 318 and 320 can be two points where the interior mechanism can be in mechanical contact with inner surface 304. The points where wheels 318 and 320 contact inner surface 304 are an essential part of the drive mechanism of the ball, and so are preferably coated with a material to increase friction and reduce slippage. For example, the wheels 318 and 320 can be covered with silicone rubber tires.

In some variations, a biasing mechanism is provided to actively force the wheels 318, 320 against the inner surface 304. In an example provided, the spring 312 and end 310 can comprise a biasing mechanism. More specifically, spring 312 and spring end 310 are positioned to contact inner surface 304 at a point diametrically opposed to wheels 318 and 320. Spring 312 and end 310 provide additional contact force to reduce slippage of the wheels 318 and 320, particularly in situations where the interior mechanism is not positioned with the wheels at the bottom and where gravity does not provide adequate force to prevent the drive wheels from slipping. The spring 312 is selected to provide a small force pushing wheels 318 and 320, and the spring end 310 evenly against inner surface 304.

The spring end 310 is designed to provide near-frictionless contact with inner surface 304. The spring end 310 comprises a rounded surface configured to mirror a low-friction contact region at all contact points with the inner surface 304. Additional means of providing near-frictionless contact may be provided. In another implementation, the rounded surface may include one or more bearings to further reduce friction at the contact point where end 310 moves along inner surface 304. The spring 312 and the spring end 310 are preferably made of a non-magnetic material to avoid interference with sensitive magnetic sensors.

Figure 3B:
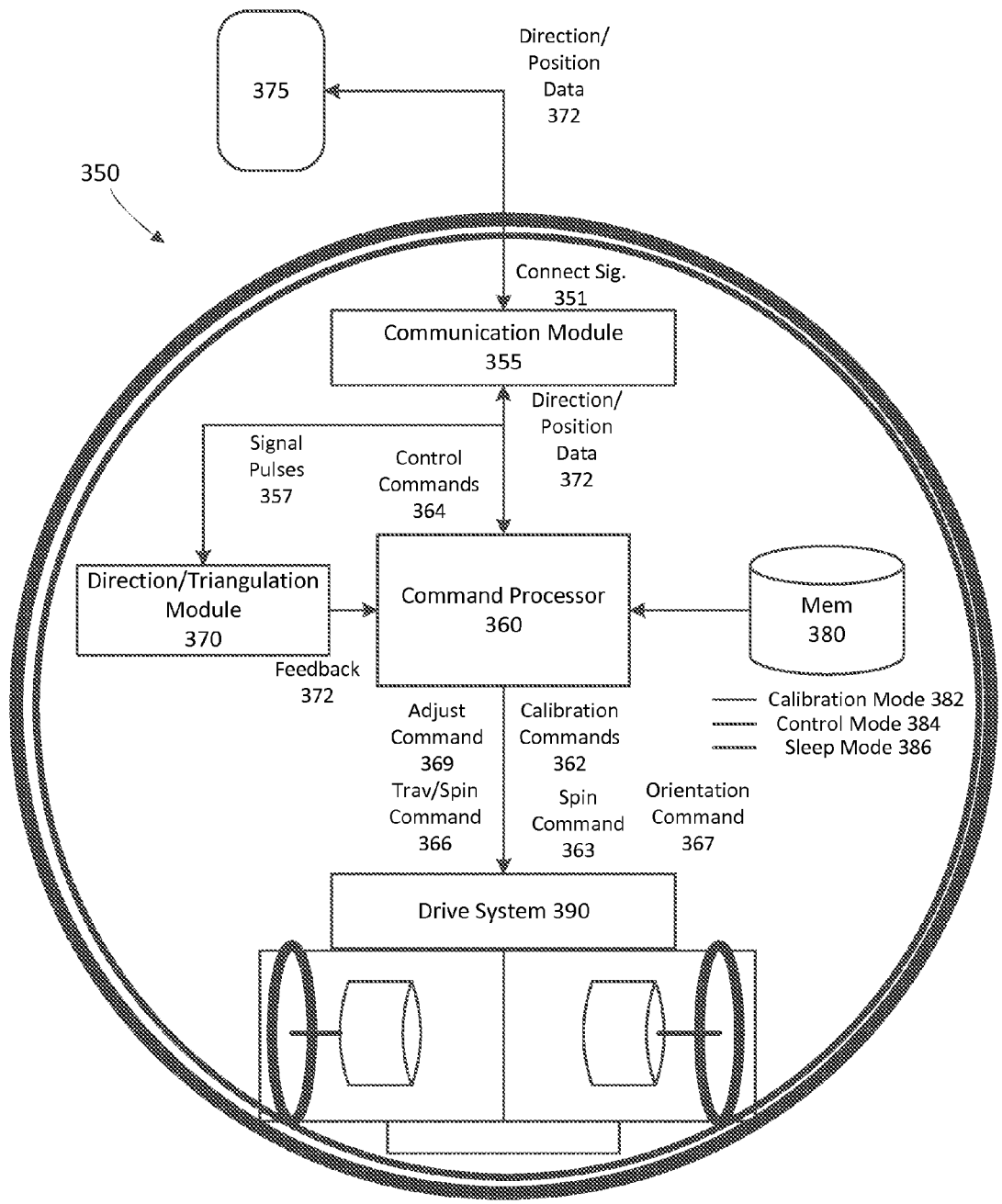
FIG. 3B is a block diagram illustrating an example self-propelled device upon which one or more example described herein may be implemented.

FIG. 3B is a block diagram illustrating an example self-propelled device upon which one or more example described herein may be implemented. The self-propelled device 350 can include a communication module 355 (e.g., a Bluetooth low energy module), which can receive a connection signal 351 from the mobile computing device 375. The connection signal 351 can cause the self-propelled device 350 to transition from a sleep mode 386, in which most or all dynamic components of the self-propelled device 350 are deactivated, to a calibration mode 382. The self-propelled device 350 can include a local memory 380 which can store instructions for implementation of each of the sleep mode 386, the calibration mode 382, and the control mode 384.

Once the connection is established, the execution of the calibration mode 382 may be automatic—that is, the self-propelled device 350 can automatically perform an initial spin without input from the mobile computing device 375. Accordingly, the control processor 360 of the self-propelled device 350 can generate a number of calibration commands 362 for implementation on the drive system 390. The calibration commands 362 can include an initial spin command 363, which, when implemented on the drive system 390, causes the self-propelled device 350 to perform an initial spin. The calibration commands 362 can further include a traverse/spin command 366, which, when implemented on the drive system 390, can cause the self-propelled device 350 to traverse a certain distance (e.g., orthogonally with respect to the mobile computing device 375), and perform a secondary spin.

According to some implementations, the self-propelled device 350 can include a directional module 370 which can detect signal pulses 357 while the self-propelled device 350 performs the initial or secondary spin. After the initial spin, the directional module 370 can identify a direction to the mobile computing device 375, based on the signal pulses 357 caused by the asymmetry in the radiation pattern. The directional module 370 can provide feedback 372 to the command processor 360, which can generate an additional calibration command 362 in order to orient the device based on the direction to the mobile computing device 375. For example, based on the directional relationship, the command processor 360 can generate an orientation command 367, which, when implemented on the drive system 390, can cause the self-propelled device 350 to turn and maneuver such that a forward direction leads directly away from the mobile computing device 375.

Additionally or alternatively, after the initial spin, and while still in calibration mode 382, the command processor can subsequently and automatically generate the traverse/spin command 366, which can cause the self-propelled device 350 to traverse a distance and perform the secondary spin. In accordance with some examples described herein, the second spin can cause the directional module 370, which can double as a directional/triangulation module 370, to detect the signal pulses based on the second spin, and triangulate a positional relationship between the self-propelled device 350 and the mobile computing device 375. Accordingly, the directional/triangulation module 370 can provide such positional feedback 372 to the command processor 360. Based on such feedback 372, the command processor 360 can perform any number of functional operations, as described above.

In some examples, it is contemplated that the self-propelled device 350 play an even more active role in the calibration than provided above with regards to FIG. 3. Thus, as an addition, the command processor 360 can provide, dynamically or periodically, directional and/or positional data 372 to the mobile computing device 375 in order to enable the mobile computing device 375 to perform calibration functions (e.g., calibrate virtual controls).

After initial calibration, which may be after the initial spin, the traverse and secondary spin, or the directional orienting, the command processor 360 can initiate control mode 384 in which the self-propelled device can receive control commands 364 from the mobile computing device 375, can implement them on the drive system 390. Thus, in control mode 384, the self-propelled device 350 can be operated by a user of the mobile computing device 375.

Additionally, while in control mode 384 the command processor 360 can continue to receive feedback 372 from the directional/triangulation module 370. Such feedback 372 may indicate that a current directional or positional relationship between the mobile computing device 375 and the self-propelled device 350 is diverging. Accordingly, the command processor 360 can process such feedback 372 and generate an adjustment command 369. The adjustment command 369 may be implemented on the drive system 390 in conjunction with the control commands 364, such that calibration is performed dynamically. Such adjustment commands 369 may be implemented in a manner in which the user experience is preserved. For example, as a user of the mobile computing device 375 operates the self-propelled device 350, the feedback 372 may indicate that re-calibration is need for more accurate control command 364 implementation. Thus, during operation of the self-propelled device 350, the command processor 360 can implement adjustment commands 369 on the drive system 390 to correct for such divergences.

Figure 4A:
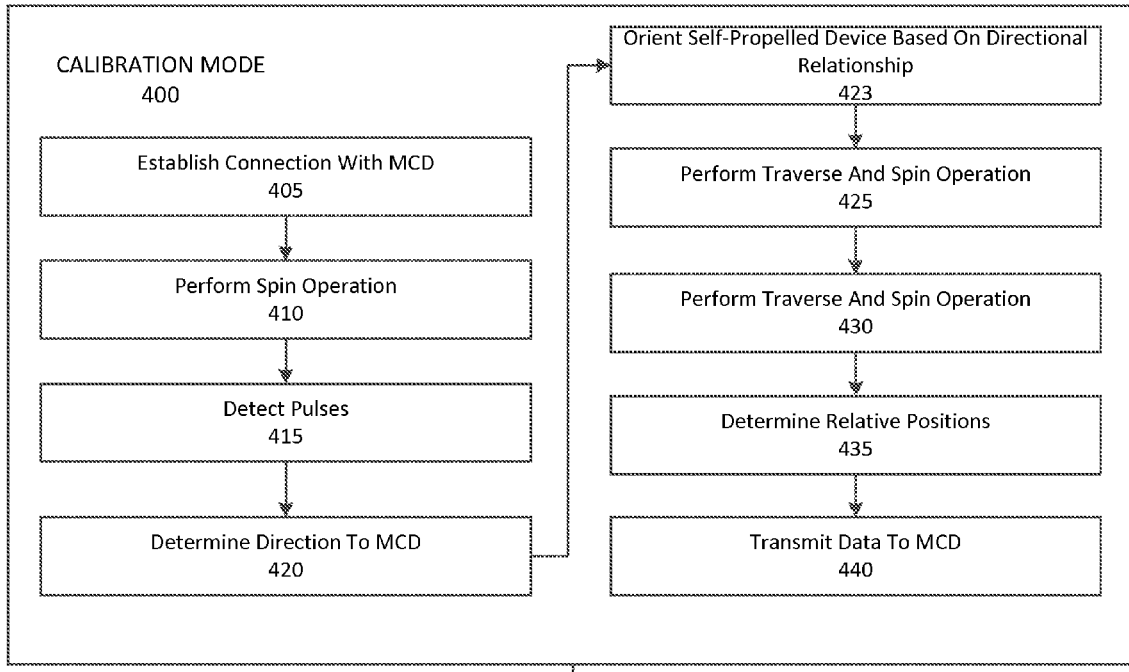
FIGS. 4A-4B are flow charts describing example operations of determining relative orientation performed by a self-propelled device.
Figure 4B:
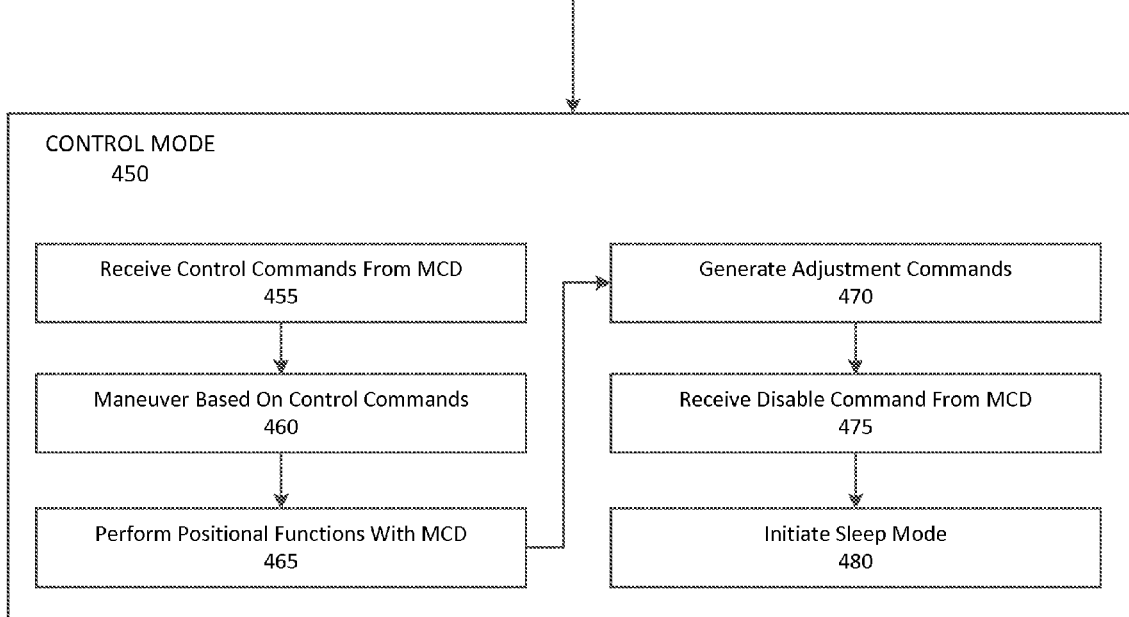

FIGS. 4A-4B are flow charts describing example operations performed by a self-propelled device in both calibration mode and control mode. In the below discussion of FIGS. 4A-4B, reference may be made to like reference characters representing various features of FIG. 3B for illustrative purposes. Furthermore, the processes described in connection with FIGS. 4A-4B may be performed by the self-propelled device 350 as illustrated in FIG. 3B. Referring to FIG. 4A, the self-propelled device 350 can establish a connection with the mobile computing device 375 (405), which can automatically trigger the command processor 360 to initiate the calibration mode 382 (400). Upon initiating calibration mode 382, the command processor 360 can generate a spin command 363, causing the self-propelled device 350 to perform an initial spin (410). Due to the asymmetry in the radiation pattern of the signal emission as discussed herein, the self-propelled device 350 can detect signal pulses 357 during the initial spin (415). Based on the initial signal pulses, the self-propelled device 350 can determine a direction to the mobile computing device 375 (420). Based on the determined direction, the command processor 360 can generate an orientation command 367, which can cause the self-propelled device 350 to be properly oriented in relation to the mobile computing device 375.

Additionally or alternatively, while in calibration mode 382, the command processor 360 instigate a traverse/spin command 366 to further determine a positional relationship between the mobile computing device 375 can the self-propelled device 350. The traverse/spin command 366 can cause the self-propelled device 350 to perform a traverse (e.g., orthogonal to the mobile computing device 375) and secondary spin operation (430). Based on detected signal pulses 357 from the second spin, the self-propelled device 350 can triangulate a positional relationship between the self-propelled device 350 and the mobile computing device 375 (435). Optionally, the self-propelled device 350 can transmit such positional or directional data to the mobile computing device 375 for calibration.

After initial calibration, the self-propelled device 350 can initiate control mode (450) and receive control commands 364 from the mobile computing device 375 (455). The command processor 360 of the self-propelled device 350 can implement such control commands 364 on the drive system 390, and maneuver according to such control commands 364 (460). As described above, various functions may be performed based on the positional relationship between the self-propelled device 350 and the mobile computing device 375 (465). Additionally, upon determining that the calibrated relative directional and/or positional relationship between the mobile computing device 375 and the self-propelled device 350 is diverging, the command processor 360 of the self-propelled device 350 can generate and implement any number of adjustment commands 369 to correct for such divergence (470). Such adjustments may be performed periodically (e.g., every 10 seconds, 60 seconds, 100 seconds, etc.), or dynamically whenever such divergences are identified.

When a user inputs an end command to end operations of the self-propelled device 350, the self-propelled device 350 can receive a disable command from the mobile computing device 375 (475). Upon receiving the disable command, the self-propelled device 350 can power down dynamic components and initiate sleep mode 386 (480).

Hardware Diagram

Figure 5:
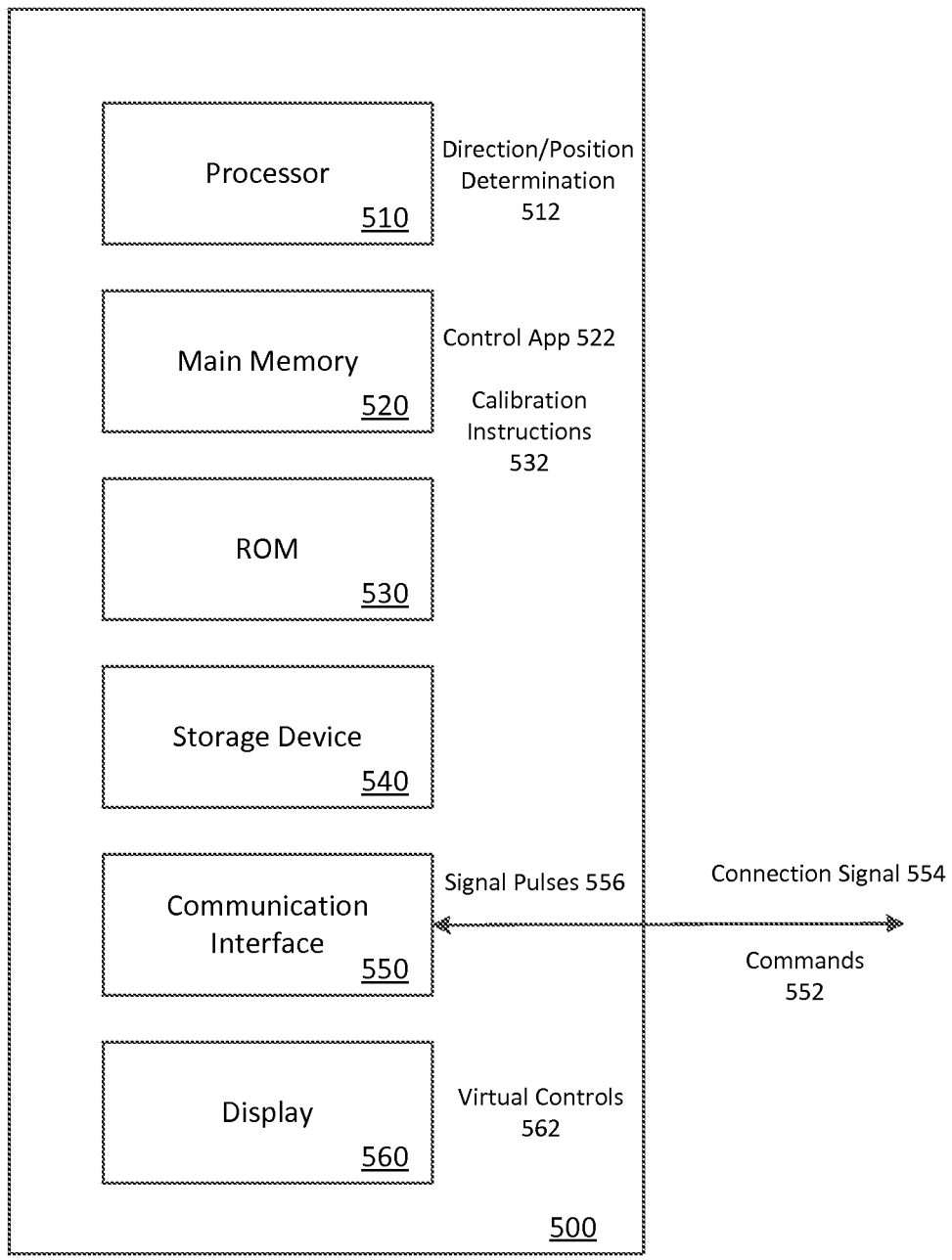
FIG. 5 is a block diagram that illustrates a computer system upon which examples described may be implemented.

FIG. 5 is a block diagram that illustrates a computer system upon which examples described may be implemented. For example, one or more components discussed with respect to the systems and the methods described herein may be performed by the system 500 of FIG. 5. The systems and methods described can also be implemented using a combination of multiple computer systems as described by FIG. 5.

In one implementation, the computer system 500 includes processing resources 510, a main memory 520, ROM 530, a storage device 540, a communication interface 550, and a display 560. The computer system 500 includes at least one processor 510 for processing information and a main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include a read only memory (ROM) 530 or other static storage device for storing static information and instructions for the processor 510. A storage device 540, such as a magnetic disk or optical disk, is provided for storing information and instructions. For example, the storage device 540 can correspond to a computer-readable medium that store instructions performing calibration operations discussed with respect to FIGS. 1-4.

The communication interface 550 can enable computer system 500 to communicate with a self-propelled device (e.g., cellular or Wi-Fi network) through use of a network link (wireless or wire line). Using the network link, the computer system 500 can communicate with a plurality of devices, such as the self-propelled device 150. The main memory 520 of the computer system 500 can further store the control application 522 which can be initiated by the processor 510. According to some examples, launch of the control application can cause a connection signal 554 to be transmitted to the self-propelled device. Furthermore, the computer system 500 can receive signal pulses 556 from the self-propelled device. Accordingly, the processor 510 can perform signal pulse processing in order to determine a directional and/or positional relationship 512 between the computer system 500 and the by the self-propelled device.

The computer system 500 can further transmit commands 552 to the self-propelled device. Such commands 552 may be transmitted in accordance with the executed calibration instructions 532 as, for example, spin commands, traverse/spin commands, orientation commands, and/or adjustment commands. Furthermore, in accordance with the control application 522, user inputs may be received on virtual controls 562 generated on the display 560. Such user inputs may be translated into control commands to be transmitted to the self-propelled device, causing the self-propelled device to maneuver in accordance with the user inputs.

Examples described herein are related to the use of computer system 500 for implementing the techniques described herein. According to one example, those techniques are performed by computer system 500 in response to processor 510 executing one or more sequences of one or more instructions contained in main memory 520, such as the control application 522 or calibration instructions 532. Such instructions may be read into main memory 520 from another machine-readable medium, such as storage device 540. Execution of the sequences of instructions contained in main memory 520 causes processor 510 to perform the process steps described herein. In alternative implementations, hard-wired circuitry and/or hardware may be used in place of or in combination with software instructions to implement examples described herein. Thus, the examples described are not limited to any specific combination of hardware circuitry and software.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that this disclosure is not limited to those precise examples. As such, many modifications and variations will be apparent to practitioners skilled in this art. Accordingly, it is intended that the scope of this disclosure be defined by the following claims and their equivalents.

Furthermore, it is contemplated that a particular feature described either individually or as part of an example can be combined with other individually described features, or parts of other examples, even if the other features and examples make no mentioned of the particular feature. Thus, the absence of describing combinations should not preclude the inventor from claiming rights to such combinations.

Although illustrative examples have been described in detail herein with reference to the accompanying drawings, variations to specific examples and details are encompassed by this disclosure. It is intended that the scope of the invention is defined by the following claims and their equivalents. Furthermore, it is contemplated that a particular feature described, either individually or as part of an example, can be combined with other individually described features, or parts of other examples. Thus, absence of describing combinations should not preclude the inventor(s) from claiming rights to such combinations.

While certain examples have been described above, it will be understood that the examples described are by way of example only. Accordingly, this disclosure should not be limited based on the described examples. Rather, the scope of the disclosure should only be limited in light of the claims that follow when taken in conjunction with the above description and accompanying drawings.

What is claimed is:

1. A mobile computing device comprising:
a touch-sensitive display;
one or more processors; and
one or more memory resources storing instructions that, when executed by the one or more processors, cause the one or more processors to:
establish a connection with a self-propelled device, the connections causing the self-propelled to provide an asymmetrical radiation pattern;
transmit a control command to cause the self-propelled device to initiate a spin;
while the self-propelled device is spinning, detect an initial set of pulses caused by the rotating asymmetrical radiation pattern;
based on the initial set of pulses, determine a direction towards the self-propelled device; and
based on the determined direction, transmit an orientation command to calibrate an orientation of the self-propelled device in relation to the mobile computing device.

2. The mobile computing device of claim 1, wherein the established connection comprises a Bluetooth low energy connection, and wherein the asymmetrical radiation pattern corresponds to a Bluetooth low energy radio transmission emitted from a Bluetooth low energy module of the self-propelled device.

3. The mobile computing device of claim 1, wherein the executed instructions further cause the mobile computing device to:
generate and calibrate virtual controls on the touch-sensitive display based on the determined direction.

4. The mobile computing device of claim 1, wherein the executed instructions further cause the mobile computing device to:
transmit a second control command to cause the self-propelled device to drive to a second location and perform a second spin;
while the self-propelled device is performing the second spin, detect a second set of pulses caused by the rotating asymmetrical radiation pattern; and
triangulate a positional relationship between the self-propelled device and the mobile computing device based on the initial set of pulses and the second set of pulses.

5. The mobile computing device of claim 4, wherein the executed instructions further cause the mobile computing device to:
track the positional relationship between the mobile computing device and the self-propelled device;
during operation of the self-propelled device, detect divergence in the positional relationship between the mobile computing device and the self-propelled device; and
based on the divergence, transmit one or more adjustment commands to the self-propelled device to recalibrate the positional relationship.

6. The mobile computing device of claim 3, wherein the executed instructions further cause the mobile computing device to:
receive user inputs on the calibrated virtual controls;
translate the user inputs into control commands to be implemented on an internal drive system of the self-propelled device; and
transmit the control commands to the self-propelled device for implementation.

7. The mobile computing device of claim 3, wherein the virtual controls comprise a virtual steering mechanism, and wherein calibrating the virtual controls based on the determined direction comprises orienting the virtual steering mechanism to indicate forward, backward, and rotational controls to enable a user of the mobile computing device to maneuver the self-propelled device.

8. A method of determining relative orientation between a self-propelled device and a mobile computing device, the method performed by one or more processors of the mobile computing device and comprising:
establishing a connection with a self-propelled device, the connections causing the self-propelled to provide an asymmetrical radiation pattern;
transmitting a control command to cause the self-propelled device to initiate a spin;
while the self-propelled device is spinning, detecting an initial set of pulses caused by the rotating asymmetrical radiation pattern;
based on the initial set of pulses, determining a direction towards the self-propelled device; and
based on the determined direction, transmitting an orientation command to calibrate an orientation of the self-propelled device in relation to the mobile computing device.

9. The method of claim 8, wherein the established connection comprises a Bluetooth low energy connection, and wherein the asymmetrical radiation pattern corresponds to a Bluetooth low energy radio transmission emitted from a Bluetooth low energy module of the self-propelled device.

10. The method of claim 8, further comprising:
generating and calibrating virtual controls on a touch-sensitive display of the mobile computing device based on the determined direction.

11. The method of claim 10, further comprising:
transmitting a second control command to cause the self-propelled device to drive to a second location and perform a second spin;
while the self-propelled device is performing the second spin, detecting a second set of pulses caused by the rotating asymmetrical radiation pattern; and triangulate a positional relationship between the self-propelled device and the mobile computing device based on the initial set of pulses and the second set of pulses.

12. The method of claim 11, further comprising:
tracking the positional relationship between the mobile computing device and the self-propelled device;
during operation of the self-propelled device, detecting divergence in the positional relationship between the mobile computing device and the self-propelled device; and
based on the divergence, transmitting one or more adjustment commands to the self-propelled device to recalibrate the positional relationship.

13. The method of claim 10, further comprising:
receiving user inputs on the calibrated virtual controls;
translating the user inputs into control commands to be implemented on an internal drive system of the self-propelled device; and
transmitting the control commands to the self-propelled device for implementation.

14. The method of claim 10, wherein the virtual controls comprise a virtual steering mechanism, and wherein calibrating the virtual controls based on the determined direction comprises orienting the virtual steering mechanism to indicate forward, backward, and rotational controls to enable a user of the mobile computing device to maneuver the self-propelled device.

15. A self-propelled device comprising:
an internal drive system to maneuver the self-propelled device;
one or more processors; and
one or more memory resources storing instructions that, when executed by the one or more processors, cause the self-propelled device to:
establish a connection with a mobile computing device, the connection causing the self-propelled device to emit an asymmetrical radiation pattern;
engage the internal drive system of the self-propelled device to perform an initial spin;
detect an initial set of pulses corresponding to the asymmetrical radiation pattern intersecting with a radiated signal emitted by the mobile computing device based on the established connection;
determine a direction towards the mobile computing device based on the initial set of pulses; and
based on the determined direction, maneuver the self-propelled device to calibrate an orientation in relation to the mobile computing device.

16. The self-propelled device of claim 15, further comprising:
a Bluetooth low energy module to emit a Bluetooth radio transmission comprising the asymmetrical radiation pattern upon establishing the connection;
wherein the established connection comprises a Bluetooth low energy connection.

17. The self-propelled device of claim 15, wherein the executed instructions cause the self-propelled device to engage the internal drive system to perform the initial spin automatically upon establishing the connection.

18. The self-propelled device of claim 17, wherein the executed instructions further cause the self-propelled device to:
after performing the initial spin, automatically drive to a second location and perform a second spin;
detect a second set of pulses corresponding to the asymmetrical radiation pattern intersecting with the radiated signal emitted by the mobile computing device; and
triangulate a positional relationship between the self-propelled device and the mobile computing device based on the initial set of pulses and the second set of pulses.

19. The self-propelled device of claim 18, wherein the executed instructions further cause the self-propelled device to:
receive control commands from the mobile computing device, the control commands corresponding to user inputs on virtual controls rendered on a display of the mobile computing device; and
implement the control commands on the internal drive system to maneuver the self-propelled device based on the user inputs.

20. The self-propelled device of claim 19, wherein the executed instructions further cause the self-propelled device to:
track the positional relationship between the self-propelled device and the mobile computing device;
identify a divergence in the positional relationship based on the implemented control commands; and
maneuver the self-propelled device to adjust the positional relationship and correct the divergence.

\* \* \* \* \*